(12) United States Patent
McKnight

(10) Patent No.: US 8,057,206 B1
(45) Date of Patent: *Nov. 15, 2011

(54) RECONFIGURABLE TOOLING USING VARIABLE STIFFNESS MATERIAL

(75) Inventor: Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/900,759

(22) Filed: Sep. 13, 2007

(51) Int. Cl.
*B29C 73/28* (2006.01)
*B29C 33/22* (2006.01)

(52) U.S. Cl. ......... 425/89; 425/112; 425/127; 425/577; 425/388; 425/394; 249/161

(58) Field of Classification Search .......... 249/155, 249/158, 161; 425/390, 394, 398, 89.11, 425/112, 127, 129.1, 543, 544, 577, 388
See application file for complete search history.

(56) References Cited

U.S. PATENT DOCUMENTS

| | | | |
|---|---|---|---|
| 2,954,622 A | 10/1960 | Moore | |
| 3,618,886 A * | 11/1971 | Graham | 249/155 |
| 4,522,393 A | 6/1985 | Dunn | |
| 5,151,277 A * | 9/1992 | Bernardon et al. | 249/155 |
| 5,168,635 A | 12/1992 | Hoffman | |
| 5,851,563 A | 12/1998 | Hoffman | |
| 6,000,660 A | 12/1999 | Griffin et al. | |
| 6,175,170 B1 | 1/2001 | Kota et al. | |
| 6,182,929 B1 | 2/2001 | Martin et al. | |
| 6,209,380 B1 | 4/2001 | Papazian et al. | |
| 6,265,333 B1 | 7/2001 | Dzenis et al. | |
| 6,298,896 B1 * | 10/2001 | Sherrill et al. | 249/155 |
| 6,301,742 B1 | 10/2001 | Kota | |
| 6,363,767 B1 | 4/2002 | Papazian et al. | |
| 6,447,478 B1 | 9/2002 | Maynard | |
| 6,739,861 B2 * | 5/2004 | Cournoyer et al. | 425/389 |
| 6,827,325 B2 * | 12/2004 | Hofmann et al. | 249/134 |
| 6,830,712 B1 * | 12/2004 | Roffman et al. | 425/808 |
| 7,250,839 B2 | 7/2007 | Racz et al. | |
| 7,550,189 B1 * | 6/2009 | McKnight et al. | 264/230 |
| 7,678,440 B1 | 3/2010 | McKnight et al. | |

(Continued)

FOREIGN PATENT DOCUMENTS

EP 1464459 A1 * 10/2004

(Continued)

OTHER PUBLICATIONS

Melek Yalcintas and Heming Dai, Magnetorheological and electrorheologioal materials in adaptive structures and their performance comparison, Smart Mater.Struct. 8 (1999), pp. 560-573.

(Continued)

*Primary Examiner* — Richard Crispino
*Assistant Examiner* — Thukhanh Nguyen
(74) *Attorney, Agent, or Firm* — Christopher R. Balzan

(57) ABSTRACT

In some embodiments, reconfigurable tooling is provided having an array of actuator columns affixed to a support base. A programmable controller is configured to position the actuator columns. The reconfigurable tooling has a tooling surface which includes a variable stiffness surface capable of controllable states of stiffness, the variable stiffness surface being capable of being deformed by the actuator columns in a soften state, and rigid in a stiff state. In some embodiments, the variable stiffness surface is configurable multiple times.

38 Claims, 2 Drawing Sheets

U.S. PATENT DOCUMENTS

| | | |
|---|---|---|
| 2003/0102411 A1 | 6/2003 | Kota |
| 2003/0234598 A1 | 12/2003 | Fuller et al. |
| 2003/0235460 A1 | 12/2003 | Moon et al. |
| 2004/0197519 A1 | 10/2004 | Elzey et al. |
| 2007/0188004 A1 | 8/2007 | Browne et al. |

FOREIGN PATENT DOCUMENTS

| | | |
|---|---|---|
| WO | WO 03/018853 A2 | 3/2003 |

OTHER PUBLICATIONS

Melek Yalcintas and John P. Coulter, Electrorheological material based non-homogeneous adaptive beams, Smart Marer. Struct. 7 (1998), pp. 128-143.

Erik Abrahamson, Mark Lake, Naseem Munshi, Ken Gall, Shape Memory Polymers for Elastic Memory Composites, 43rd Structures, Structural Dynamics, and Materials Conference, Apr. 22-25, 2002, pp. 1-11, Denver, Colorado, AIAA 2002-1562.

David Cadogan, Stephen Scarborough, John Lin, George Sapna, III, Shape Memory Composite Development for Use in Gossamer Space Inflatable Structures, 43rd AIAA/ASME/ASCE/AHS/ASC Structures, Structural Dynamics, and Materials Conference & Exibit, Apr. 22-25, 2002, pp. 1-11, Denver, Colorado, 2002-1372.

Will Francis, Mark Lake, Kaushik Mallick, Gregg Freebury, Arup Maji, Development and Testing of a Hinge/Actuator inforporating Elastic Memory Composites, 44th Structures, Structural Dynamics, and Materials Conference, Apr. 7-10, 2003, pp. 1-14, Norfolk, Virginia AIAA 2003-1496.

Mark S. Lake, Fred L. Beavers, The Fundamentals of Designing Deployable Structures with Elastic Memory Composites, 43rd Structures, Structural Dynamics; and Materials Conference, Apr. 22-25, 2002, pp. 1-13, Denver, Colorado AIAA 2002-1454.

Mark S. Lake, Naseem A. Munshi, Michael L. Tupper, Troy Meink, Application of Elastic Memory Composite Materials to Deployable Space Structures, AIAA Space 2001 Conference and Exposition, Aug. 28-30, 2001, pp. 1-10, AIAA 2001-4602, Albuquerque, New Mexico.

C. Liang, C.A. Rogers, E. Malafeew, Investigation of Shape Memory Polymers and Their Hybrid Composites, Journal of Intelligent Material Systems and Structures, vol. 8—Apr. 1997, pp. 380-386.

Douglas Campbell, Arup Maji, Deployment Precision and Mechanics of Elastic Memory Composites, 44th Structures, Structural Dynamics, and Materials Conference, Apr. 7-10, 2003, pp. 1-9, Norfolk, Virginia AIAA 2003-1495.

PTO Office Action dated Jan. 9, 2008 for U.S. Appl. No. 11/193,148, patent No. 7,550,189, by McKnight et al.

PTO Final Office Action dated Oct. 30, 2008 for U.S. Appl. No. 11/193,148, patent No. 7,550,189, by McKnight et al.

McKnight, et al., U.S. Appl. No. 11/347,505, filed Feb. 3, 2006.

PTO Office Action dated Mar. 31, 2010 for U.S. Appl. No. 12/467,693, filed May 18, 2009.

Applicant's Response of Jul. 21, 2010 to Office Action dated Mar. 31, 2010, in U.S. Appl. No. 12/467,693, filed May 18, 2009.

USPTO Notice of Allowance mailed Oct. 20, 2010, in U.S. Appl. No. 12/467,693, filed May 18, 2009.

* cited by examiner

RECONFIGURABLE TOOLING USING VARIABLE STIFFNESS MATERIAL

BACKGROUND

A composite structure is fabricated on tooling. Generally, the tooling is made as one piece. Thus, the tooling, form, or mold, is fabricated, and then the composite structure is fabricated on top of the tooling. Tooling is typically one sided, but could be two sided.

Typically, to form a composite structure, the composite material is placed on the tooling, and then pressure/vacuum is applied to hold the composite material during curing of the composite material, i.e. epoxy, thermoset composite, thermoplastic composite etc. Thus, to make a composite structure, the tooling is fabricated first, and then the composite structure. This process can be costly, especially for prototyping where one or two parts is made. What is needed is reconfigurable tooling, that can be easily and precisely configured and reconfigured to suit a particular need.

In one prior approach, reconfigurable modular tooling is proposed in U.S. Pat. No. 5,851,563 by Hoffman, herein incorporated by reference. A bed of pins is supported by a housing. Each pin is connected to a screw drive that allows the height of the entire array to be adjusted by a single motor that rasters across the unit. The work surface is defined by an array of "spring" heads which are mounted on ball joints and provide some degree of flexibility. A solid surface may be laid across these pins. In another approach, reconfigurable tooling is proposed for forming honeycomb cores in U.S. Pat. No. 6,209,380, by Papazian et al., herein incorporated by reference. In this approach, an array of rectangular cross section pins define a three dimensional work surface. The heads of the pins can be made of various types of spring loaded devises. This approach exhibits a degree pixelation of a surface, and thus is used for forming honeycomb cores, rather than the composite panels themselves.

What is needed is reconfigurable tooling that can provide a high stiffness continuous tool surface and still provide a large envelope of potential tool shapes. A continuous tool surface provides a high quality part exterior surface and also allows vacuum processing tools to be used reducing need for additional finish machining and lowering fabrication costs. Moreover, what is needed is a way to better tailor the surface shape of reconfigurable tooling than is possible with conventional tooling. Furthermore, what is needed is a way to control the local stiffness of a reconfigurable tooling surface.

SUMMARY

In some embodiments, reconfigurable tooling is provided having an array of actuator columns affixed to a support base. A programmable controller is configured to position the actuator columns. The reconfigurable tooling has a tooling surface which includes a variable stiffness surface capable of controllable states of stiffness, the variable stiffness surface being capable of being deformed by the actuator columns in a soften state and rigid in a stiff state. In some embodiments, the variable stiffness surface is configurable multiple times.

In some embodiments, reconfigurable tooling is provided having an array of actuator columns affixed to a support base. A means to control actuation of the actuator columns is provided. In some embodiments, the reconfigurable tooling has a tooling surface, which includes a variable stiffness surface capable of being deformed in response to the actuator columns. Furthermore, the variable stiffness surface may include controllable stiffness regions, with actuator columns coupled to the controllable stiffness regions.

In some implementations, a method is provided for forming tooling which includes configuring a variable stiffness surface and stiffening the variable stiffness surface. Further, the method includes unstiffening the variable stiffness surface and reconfiguring the tooling surface after unstiffening the variable stiffness surface.

Additional embodiments and implementations are disclosed.

BRIEF DESCRIPTION OF THE DRAWINGS

The features and advantages of the present invention will be better understood with regard to the following description, appended claims, and accompanying drawings where:

DESCRIPTION

Figure 1:
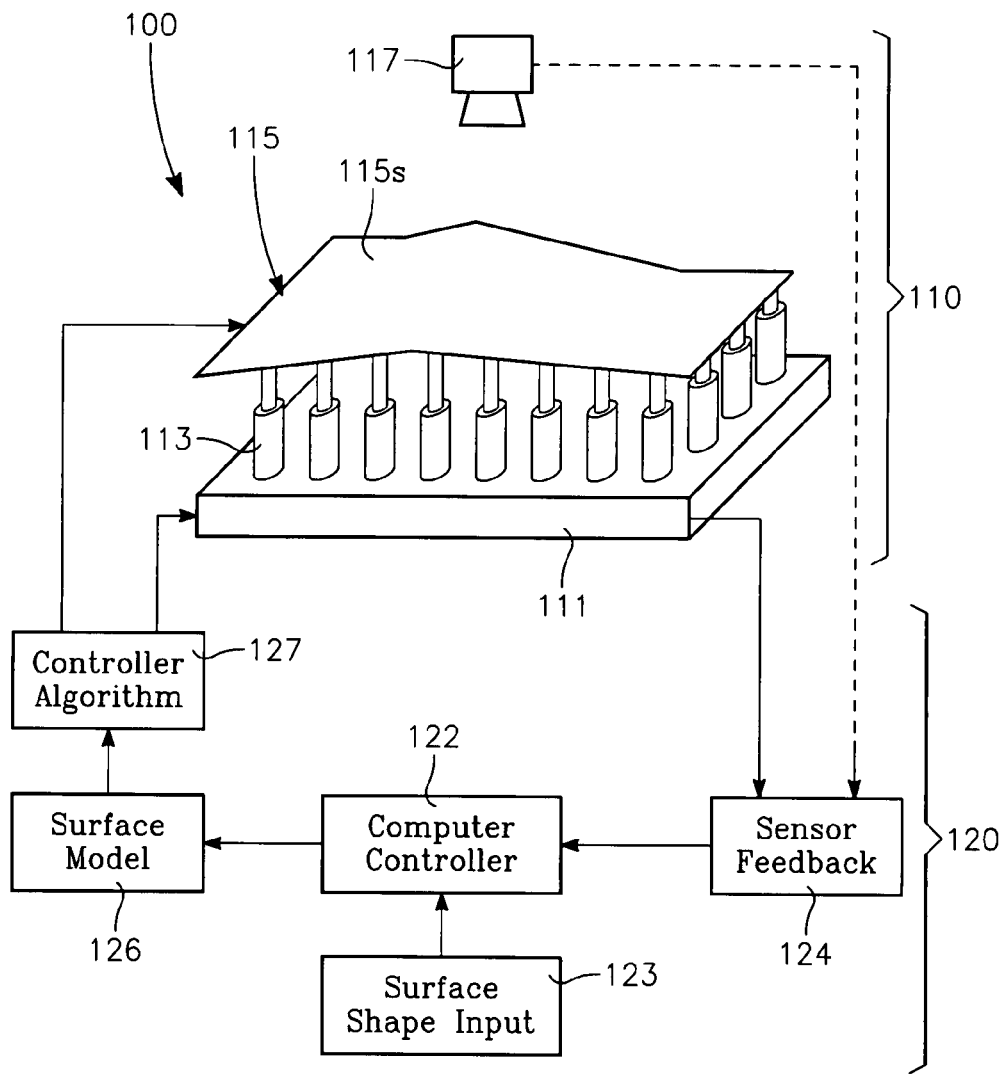
FIG. 1 shows a simplified schematic of one embodiment of a reconfigurable tooling system including a control flow diagram.

FIG. 1 shows a simplified schematic of one embodiment of a reconfigurable tooling system 100 including a control flow diagram. Some embodiments may include of several portions, which work together to provide the desired operation. They may include the mechanical, material and/or system model, and system controller units. The mechanical portion 110 of the system 100 is shown in FIG. 1 and may include several parts.

One part is a variable stiffness surface 115, which provides the form of the tooling surface 115s. Another is a array of actuator columns 113 which introduce z-axis displacements to the surface. This actuator column array 113 may be either regular or irregular depending on the needs of the tool. A potential embodiment for the actuator columns of the array 113 are described further below. The columns of the array 113 are affixed to a base support 111, which provides a ground for the forces generated on the columns of the array 113 during deformation. The base support 111 may itself be may deformed (not shown), either by mechanical linkages or using variable stiffness supports, so that a greater variety of shapes may be accommodates from a single tool. This may be useful, for example, to allow a tool to change from planar shapes to cylindrical shapes.

Various embodiments can provide two important advantages. First, because the tooling surface 115s is formed with a variable stiffness surface 115, it can provide a high stiffness continuous tool surface and still provide a large envelope of potential tool shapes. A continuous tool surface provides a high quality part exterior surface and also allows vacuum processing tools to be used. Second, local control of the stiffness of sub-regions of the surface can better tailor the surface shape than is possible with a fixed stiffness surface. Furthermore, a continuous surface allows a degree of spline interpolation between actuation points that reduces the number of necessary actuators to achieve a particular fidelity of surface shape. These advantages can improve the functionality of this reconfigurable tooling so that it can be more widely used.

A controller portion 120 of the reconfigurable tooling system 100 may have of several components. These may include a computer controller 122 for the system 100, which provides overall user control. An input 123 to the computer controller 122 provides a means to input desired shapes (CAD, FEA, etc.) into the system 100. Sensor feedback 124, from sensors at the actuator columns 123 and/or an optional global surface deformation analysis instrument 117, such as a digital image correlation system, or a laser tracker system is provided. A surface model 126 predicts shape contours for given boundary conditions and prevents failure due to overstretching or overstressing of the system 100. A controller algorithm 127 can determine the best choice of actuation and stiffness changes to the system 100 to reach the desired shape output on the variable stiffness surface 115.

The controller algorithm 127 may be obtained by many different approaches, for example, a learning based genetic algorithm may be used. This controller portion 120 enables the system 100 to provide unique functionality as compared to open-loop manual tuning of the structure. This will increase the accuracy of the tooling surface 115s, and reduce the numbers of actuators and control points required to reach the desired shape.

In some embodiments, the surface shape input 123 and the sensor feedback 124 may be provided to a microcontroller device (not shown), or a processor based system, such as a computer. The surface model 126 may be input into, or computed by, the computer, which may be programmed with the controller algorithm 127. Typically, this would include the use of memory, or other storage devices (not shown). Thus, the controller portion 120 may be implemented in software and/or hardware, or the columns may be manually manipulated (not shown), or by a combination thereof, to provide a means to control the position of the actuator columns.

Figure 2:
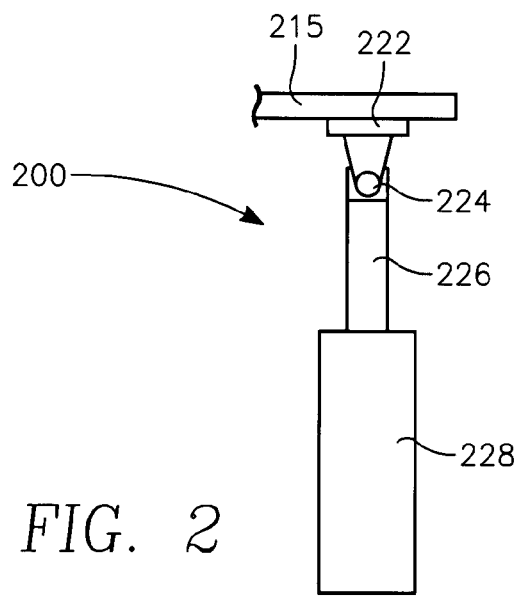
FIG. 2 shows a side view of one potential design for an actuation column.

FIG. 2 shows a side view of one potential design for an actuation column 200. The actuation column 200 are provided in an array 113 (shown in FIG. 1), to define the forces applied to the surface. In the embodiment of FIG. 2, the actuator arm 226 is attached to the variable stiffness surface 215 by a ball joint pivot 224. Z-axis (vertical) actuator so need a ball joint to allow lateral force as surface tilts or stretches. The column is relatively stiff, the pivot point allows a rotation but will transmit lateral loads. The pivot point will allow two axis movement.

The variable stiffness surface 215 may be adhesively fixed to the actuation column 200 in order to reduce the stress concentration near the connection. In some embodiments, a detachable load spreader 222 is connected to the ball joint 224. Connection to variable stiffness surface detachable so can release surface if want to use for multiple surfaces. Detachable at load spreader contact surface, may have adhesive or velcro or other release mechanism between load spreader and surface, or between load spreader 222 and actuator arm 226. This connection may also be made using through bolting and/or pin supports (not shown), or other detachable connection.

A motor or hydraulic actuator 228 is attached to the actuation arm 226, which provides the necessary level of z direction actuation to the variable stiffness surface 215. The actuator 228 should be capable of repeatable displacement output and force requisite with that necessary to deform the variable stiffness surface 215. The actuator 228 itself may be mechanical (for example a screw drive), electromagnetic, hydraulic, ultrasonic piezoelectric, or other similar technology. The actuator 228 may be selected based on the desired force level and displacement accuracy. Combinations of various types of actuators in series may be used to provide both large extensions and high precision.

In one embodiment, the variable stiffness surface 115 (shown in FIG. 1), may be a composite structure of shape memory polymer in combination with steel or aluminum platelet/segment reinforcement as disclosed in U.S. patent application Ser. No. 11/193,148, filed Jul. 29, 2005, by McKnight et al., entitled VARIABLE STIFFNESS STRUCTURE, herein incorporated by reference. In one embodiment, the variable stiffness surface 115 has the property of being stiff and strong below a transition temperature, and then once raised above a threshold transition temperature, reduces stiffness and increases the malleability. Deformations accrued in the high temperature state, can be elastically recovered while in the high temperature state, or can be "set" or be quasi-permanent by cooling below a transition temperature. If heated above the transformation temperature without constraint, the variable stiffness surface 115 recovers the deformation and return to the original home state.

In embodiments where thermally activated shape memory polymer is used, certain considerations must be taken into account. First, the transition temperature of the shape memory polymer material of the variable stiffness surface 115 must be above the processing temperature of the workpiece. Currently, shape memory polymers with many chemistries have been formulated and the transition temperature can be varied between room temperature and 160 C. Higher temperature formulations may be conceived in the future which will allow higher temperature resins to be more easily processed using a reconfigurable tooling surface.

A second condition resulting from the use of the variable stiffness surface 115, are considerations of the resistance of the tooling surface to deformations when being used as a tool, which could lead to inaccuracies in the tool shape. In general, a thicker variable stiffness surface 115 will provide a more rigid support for composite manufacturing operations. Thicker surfaces 115, however, will require that larger strains be accommodated in the surface 115 during the course of deforming from one shape to another. In general, the variable stiffness surface 115 must be selected for a particular range of operation to provide the required stiffness and/or recoverable strain values. This must be considered as part of the whole system design, but, in some embodiments, it is expect that practical surfaces may be produced with thicknesses ranging from about 0.5 mm to about 20 mm. The stiffness of the variable stiffness surface 115 may be between very rigid plastic and aluminum. This will provide sufficient stiffness to tolerate vacuum pressure applied to the mold to assist in maximizing volume fraction in wet lay up and resin transfer molding approaches. Depending on the design of the system, hydrostatic pressure such as that achieved in an autoclave can be used to further consolidate the composite parts.

In some embodiments, to exact a change in stiffness, the variable stiffness surface 115 must be heated above its transition temperature. This may be performed using a variety of methods. The first is environment heating where the surface is subject to still or moving air which has been previously heated using heating coils. Another possible approach is the incorporation of integrated resistive heating elements within the variable stiffness surface 115. These must be able to accommodate deformation, or not at least not detrimentally interfere with the deformation of the variable stiffness surface. Embedded heaters offer one of the fastest method of heating the material. Other potential approaches include microwave heating through small dielectric particles incorporated into the shape memory polymer material. Applying microwaves to these materials will induce volumetric heating that is also potentially provides large rates of temperature increase. Another method to heat the surface is place heating blankets on top of surface. Another is to used heated air guns to indirectly hear the surface. Many other methods are possible.

One method of improving the surface control precision is to subdivide the heating elements into subregions such that the stiffness across the area of the surface can be individually tailored. An example of this is discussed in detail in the U.S. patent application Ser. No. 11/347,505, filed Feb. 3, 2006, by McKnight et al., entitled ACTUATION CONCEPTS FOR VARIABLE STIFFNESS MATERIALS, herein incorporated by reference, which discusses techniques for control of heating, or stiffness along various zones to tailor shape. This allows the variable stiffness surface to achieve a large number of shape outputs in response to discrete actuation inputs.

Figure 3:
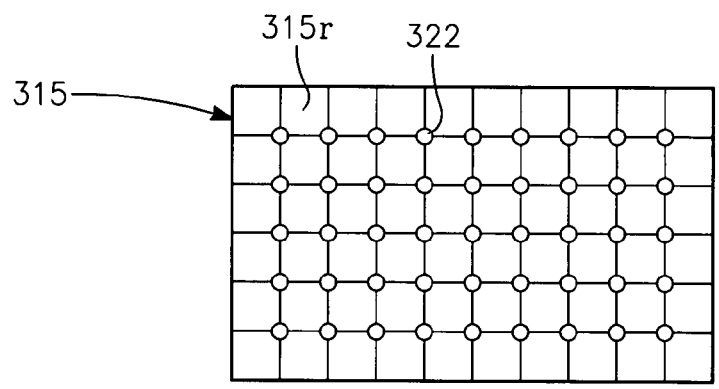
FIG. 3 shows a conceptual illustration of a top view of an embodiments of the variable stiffness surface.

FIG. 3 shows a conceptual illustration of a top view of an embodiments of the variable stiffness surface 315. A grid of variable stiffness control regions 315r, and an array of attachment points 322 for the actuation members (not shown). This grid shows a total of 5×9, or 45 actuator attachment points 322. The number of actuation points will help determine the accuracy of the surface. One chief discriminator of some embodiments over previous inventions is the ability to spline fit between actuation points, thus increasing significantly the precision of surface control.

The surface 315 can be subdivided into control regions 315r for which the stiffness can be individually controlled. The control regions 315r can provide higher and lower stiffness regions within the variable stiffness surface 315 during deformation of the variable stiffness surface 315. For example, the heating of the individual control regions 315r can be different, some made hot and some cold to control stiffness in the different regions 315r.

By taking advantage of non-uniform stiffness capability of the surface 315, further control of deformation can be achieved in the surface when you apply a particular actuation combination. The control algorithm may be used to control the stiffness of the regions 315r in combination with control of the actuators (not shown in FIG. 3). This allows greater precision and control with same set of actuators.

In FIG. 3, the variable stiffness surface 315 is shown subdivided in discrete control regions 315r in a grid fashion. The layout of this grid of control regions 315r is variable and may be regular or irregular depending on the particular application. For certain applications, the entire surface may be controlled as a single stiffness region and solely actuation is used to control the deformation of the surface rather than combinations of actuation and regional stiffness control. The actuators (not shown in FIG. 3) may be attached to this grid of control regions 315r in a number of ways. For example, the attachment points 322 may be at the vertices of the control regions 315r, as shown in FIG. 3, in the center (not shown) of the control region 315r, or some combination or variation this.

Referring to FIG. 1, because the deformations may be held with zero power in some embodiments, the tools need not be attached to the base 111 once shape forming is complete. Thus, in embodiments where the variable stiffness surface 115 is removable, it is possible to create several tooling surfaces 115s for use at the same time, with a single actuation base 111 unit. At the end of a production run, the tooling surfaces 115s could be reset to begin another project.

Figure 4:
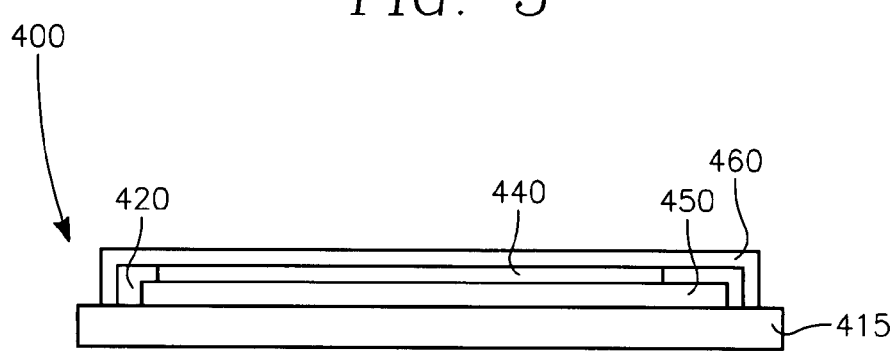
FIG. 4 shows a cut away side view of a composite processing system for resin infusion type processing.

FIG. 4 shows a cut away side view of a composite processing system 400 for resin infusion type processing. A resin infusion layer 440 is supplied to the composite workpiece 450 via a resin infusion port 420. A vacuum enclosure 460, such as a vacuum bag, encloses the composite workpiece 450, which may be a composite reinforcement perform, over the variable stiffness tooling surface 415. This type of process may be easily employed with solid surface reconfigurable tooling as described in this discussion. Many other techniques may benefit from this type of tooling. These include vacuum assisted resin transfer molding, wet lay-up, spray forming with chopped fiber, and the like. This invention is suitable for use with thermoplastic matrix composite materials as long as the thermoplastic matrix flow temperature is below the glass transition temperature of the variable stiffness materials.

The example embodiments herein are not intended to be limiting, various configurations and combinations of features are possible. Having described this invention in connection with a number of embodiments, modification will now certainly suggest itself to those skilled in the art. As such, the invention is not limited to the disclosed embodiments, except as required by the appended claims.

What is claimed is:

1. Reconfigurable tooling comprising:
    a) an array of actuator columns affixed to a support base;
    b) a programmable controller configured to position the actuator columns;
    c) a tooling surface comprising a variable stiffness surface capable of controllable states of stiffness, the variable stiffness surface being capable of being deformed by the actuator columns in a soften state and rigid in a stiff state, and wherein the variable stiffness surface is configurable multiple times; and
    d) wherein the variable stiffness surface comprises a reinforced composite structure.

2. The reconfigurable tooling of claim 1, wherein the variable stiffness surface is capable of comprising regions of different stiffnesses.

3. The reconfigurable tooling of claim 1, wherein the variable stiffness surface comprises a grid of controllable stiffness regions.

4. The reconfigurable tooling of claim 3, wherein the controllable stiffness regions are generally polygonal comprising vertices, and wherein the actuator columns are coupled to the vertices of the controllable stiffness regions.

5. The reconfigurable tooling of claim 3, wherein the actuator columns are coupled to a central location of the controllable stiffness regions.

6. The reconfigurable tooling of claim 1, wherein the base is deformable.

7. The reconfigurable tooling of claim 1, wherein the variable stiffness surface is capable of holding a deformation imparted by the array of actuator columns without applied power.

8. The reconfigurable tooling of claim 7, wherein the variable stiffness surface is capable of recovering the deformation.

9. The reconfigurable tooling of claim 8, wherein the variable stiffness surface comprises shape memory polymer.

10. The reconfigurable tooling of claim 7, wherein the variable stiffness surface is capable of zero power hold and of recovering the deformation.

11. The reconfigurable tooling of claim 10, wherein the variable stiffness surface comprises a shape memory polymer.

12. Reconfigurable tooling comprising:
    a) an array of actuator columns affixed to a support base;
    b) a means to control actuation of the actuator columns;
    c) a tooling surface comprising a variable stiffness surface deformable in response to the actuator columns, the variable stiffness surface being capable of holding a deformation imparted by the array of actuator columns, and wherein the variable stiffness surface is capable of recovering the deformation; and d) wherein the variable stiffness surface comprises a reinforced composite structure.

13. The reconfigurable tooling of claim 12, wherein the variable stiffness surface is capable of comprising regions of different stiffnesses.

14. The reconfigurable tooling of claim 12, wherein the variable stiffness surface comprises a grid of controllable stiffness regions.

15. The reconfigurable tooling of claim 14, wherein the controllable stiffness regions are generally polygonal comprising vertices, and wherein the actuator columns are coupled to the vertices of the controllable stiffness regions.

16. The reconfigurable tooling of claim 14, wherein the actuator columns are coupled to a central location of the controllable stiffness regions.

17. The reconfigurable tooling of claim 12, wherein the base is deformable.

18. The reconfigurable tooling of claim 12, wherein the variable stiffness surface comprises a shape memory polymer.

19. Reconfigurable tooling comprising:
    a) an array of actuator columns affixed to a support base;
    b) a programmable controller configured to position the actuator columns;
    c) a tooling surface comprising a variable stiffness surface having regions of controllable stiffness, the regions being deformable in response to the actuator columns based on a selected stiffness for each of the regions; and
    d) wherein the variable stiffness surface comprises a reinforced composite structure.

20. The reconfigurable tooling of claim 19, wherein the variable stiffness surface comprises a grid of controllable stiffness regions.

21. The reconfigurable tooling of claim 20, wherein the controllable stiffness regions are generally polygonal comprising vertices, and wherein the actuator columns are coupled to the vertices of the controllable stiffness regions.

22. The reconfigurable tooling of claim 20, wherein the actuator columns are coupled to a central location of the controllable stiffness regions.

23. The reconfigurable tooling of claim 19, wherein the base is deformable.

24. The reconfigurable tooling of claim 19, wherein the variable stiffness surface is capable of holding a deformation imparted by the array of actuator columns.

25. The reconfigurable tooling of claim 24, wherein the variable stiffness surface is capable of recovering the deformation.

26. The reconfigurable tooling of claim 25, wherein the variable stiffness surface comprises a shape memory polymer.

27. The reconfigurable tooling of claim 24, wherein the variable stiffness surface is capable of zero power hold and of recovering the deformation.

28. The reconfigurable tooling of claim 27, wherein the variable stiffness surface comprises a shape memory polymer.

29. Reconfigurable tooling comprising:
    a) an array of actuator columns affixed to a support base;
    b) a means to control actuation of the actuator columns;
    c) a tooling surface comprising a variable stiffness surface capable of being deformed in response to the actuator columns, the variable stiffness surface being capable of providing a heterogenous stiffness; and
    d) wherein the variable stiffness surface comprises a reinforced composite structure.

30. The reconfigurable tooling of claim 29, wherein the variable stiffness surface comprises controllable stiffness regions, and wherein the actuator columns are coupled to the controllable stiffness regions.

31. The reconfigurable tooling of claim 29, wherein the base is deformable.

32. The reconfigurable tooling of claim 29, wherein the variable stiffness surface is capable of holding a deformation imparted by the array of actuator columns with zero power hold, and wherein the variable stiffness surface is capable of recovering the deformation.

33. The reconfigurable tooling of claim 29, wherein the variable stiffness surface comprises a shape memory polymer.

34. Reconfigurable tooling comprising:
    a) an array of actuator columns affixed to a support base;
    b) a programmable controller configured to position the actuator columns;
    c) a tooling surface comprising a variable stiffness surface capable of controllable states of stiffness, the variable stiffness surface being capable of being deformed by the actuator columns in a soften state and rigid in a stiff state, and wherein the variable stiffness surface is configurable multiple times; and
    d) wherein the base is deformable.

35. The reconfigurable tooling of claim 1, wherein the composite structure comprises a variable modulus material in combination with constant stiffness material segment reinforcement.

36. The reconfigurable tooling of claim 12, wherein the composite structure comprises a variable modulus material in combination with constant stiffness material segment reinforcement.

37. The reconfigurable tooling of claim 19, wherein the composite structure comprises a variable modulus material in combination with constant stiffness material segment reinforcement.

38. The reconfigurable tooling of claim 29, wherein the composite structure comprises a variable modulus material in combination with constant stiffness material segment reinforcement.

\* \* \* \* \*